(12) United States Patent
Bigolin et al.

(10) Patent No.: US 12,116,071 B2
(45) Date of Patent: Oct. 15, 2024

(54) SADDLE FOR VEHICLES, SUCH AS BICYCLES

(71) Applicant: Brooks England Limited, West Midlands (GB)

(72) Inventors: Barbara Bigolin, West Midlands (GB); Marco Malfatti, West Midlands (GB)

(73) Assignee: Brooks England Limited, West Midlands (GB)

( * ) Notice: Subject to any disclaimer, the term of this patent is extended or adjusted under 35 U.S.C. 154(b) by 106 days.

(21) Appl. No.: 17/796,492

(22) PCT Filed: Jan. 21, 2021

(86) PCT No.: PCT/IB2021/050447
§ 371 (c)(1),
(2) Date: Jul. 29, 2022

(87) PCT Pub. No.: WO2021/152429
PCT Pub. Date: Aug. 5, 2021

(65) Prior Publication Data
US 2023/0348002 A1 Nov. 2, 2023

(30) Foreign Application Priority Data
Jan. 29, 2020 (IT) .................... 102020000001699

(51) Int. Cl.
*B62J 1/08* (2006.01)
*B62J 1/26* (2006.01)

(52) U.S. Cl.
CPC .. *B62J 1/08* (2013.01); *B62J 1/26* (2013.01)

(58) Field of Classification Search
CPC ..................................... B62J 1/08; B62J 1/26
See application file for complete search history.

(56) References Cited

U.S. PATENT DOCUMENTS

| | | | |
|---|---|---|---|
| 1,964,903 A | 7/1934 | Bronson | |
| 3,756,653 A * | 9/1973 | Worley | B62J 1/08 297/214 |
| 7,699,391 B2 * | 4/2010 | Riondato | B62J 1/007 297/202 |
| 9,751,580 B2 * | 9/2017 | Bigolin | B32B 25/10 |
| 10,421,513 B2 * | 9/2019 | Checchin | B62J 1/007 |
| 2004/0004374 A1 | 1/2004 | Garland et al. | |

FOREIGN PATENT DOCUMENTS

| | | |
|---|---|---|
| CN | 2084446 U | 9/1991 |
| GB | 115407 A | 5/1918 |
| GB | 128384 A | 6/1919 |
| GB | 143666 A | 6/1920 |
| WO | 2006015731 A1 | 2/2006 |
| WO | 2014203165 A | 12/2014 |

OTHER PUBLICATIONS

International Search Report for PCT/IB2021/050447 dated Mar. 12, 2021 (3 pages).

* cited by examiner

*Primary Examiner* — Philip F Gabler
(74) *Attorney, Agent, or Firm* — Tutunjian & Bitetto, P.C.

(57) ABSTRACT

The present invention relates to a saddle for vehicles, such as bicycles, motorcycles and the like, including a seat component defining a support surface for a user as well as a fork component.

14 Claims, 5 Drawing Sheets

SADDLE FOR VEHICLES, SUCH AS BICYCLES

TECHNICAL FIELD OF THE INVENTION

The present invention relates to a saddle for vehicles, such as bicycles, motorcycles and the like.

STATE OF THE PRIOR ART

The state of the art as regards bicycle saddles or the like mainly comprises seats made up of forks, or other similar elements, for connection to the seat post, rigid elements for supporting a seat, typically made of material which in time can give way and wear out, are associated to the seats.

The international application published under number WO2014203165 teaches a seat for bicycle saddles which comprises a vulcanized rubber top with external covering fabric for aesthetic purposes to be fastened to the fork or better to respective rear and front fastening components. In addition, the seat for bicycle saddles includes a rear metal reinforcement, a front metal reinforcement as well as a PA/PE fabric designed to increase the traction resistance of the saddle.

Both the metal reinforcements and the PA/PE fabric are placed in the top before the vulcanization of the respective rubber and are embedded in the latter following vulcanization.

However, after a certain period of use, this solution may present problems of misalignment between the fork and the reinforcement inserts. In addition, the structural fabric made of PA/PE over time may be subject to a lower resistance to the traction of the saddle due to wear and the period of use of the saddle. In addition, the vulcanization process of the top, being made by both of the two metal reinforcements and of the PA/PE fabric embedded in the rubber, is a complex process that requires a prolonged period of time for its realization.

SUMMARY OF THE INVENTION

The technical task of the present invention is therefore to improve the state of the art.

Within such a task, an object of the present invention is to devise a saddle for vehicles, such as bicycles capable of simplifying and decreasing the time required for the vulcanization process of the top and thus improving its efficiency.

A further object of the present invention is to avoid or reduce any problems of loose between the fork and the components of the saddle after a determined period of use.

Another object of the present invention is to improve the tightness and strength of the saddle after a long period of use of the same.

A further object of the present invention is to control the flexibility of the saddle on the basis of the geometries, thicknesses and material used to make the shell.

Another object of the present invention is to provide a saddle better than the traditional ones, in particular with compression and therefore comfort zones which can be differentiated according to needs.

This task and these objects are all achieved by the saddle for vehicles, such as bicycles according to the present application.

The present application refers to preferred and advantageous embodiments of the invention.

BRIEF DESCRIPTION OF THE DRAWINGS

Further aspects and advantages of the present invention will become clearer from the following detailed description of an embodiment of the saddle according to the present invention, illustrated purely by way of non-limiting example in the accompanying drawings, in which.

DETAILED DESCRIPTION OF THE INVENTION

Figure 1:
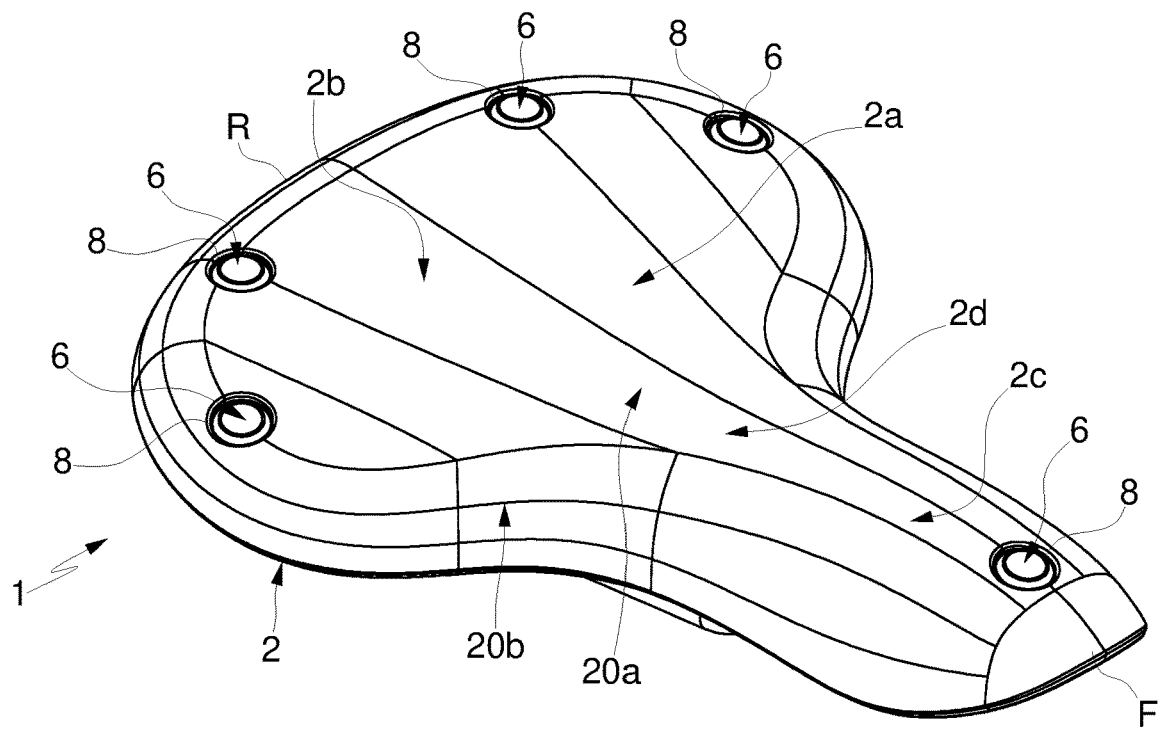
FIGS. 1 and 2 are perspective views slightly from above and from below, respectively, of a saddle according to the present invention.
Figure 2:
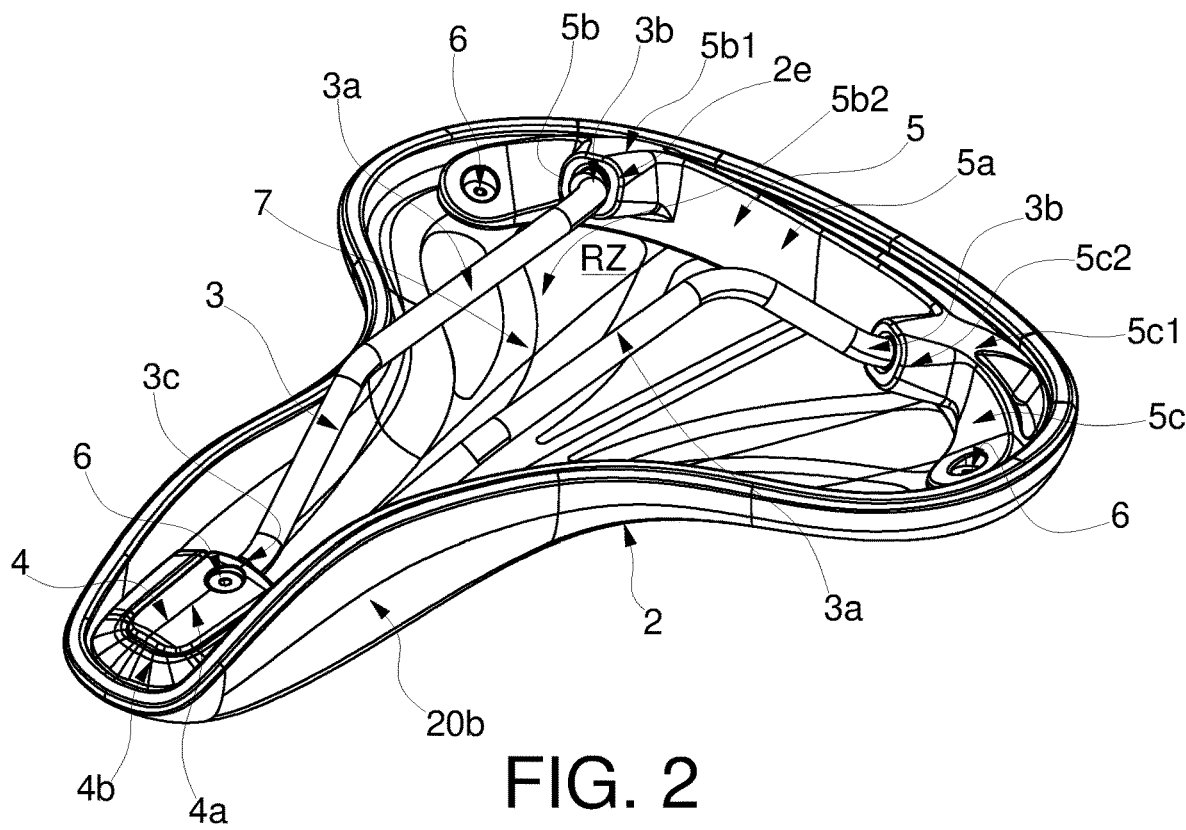
Figure 3:
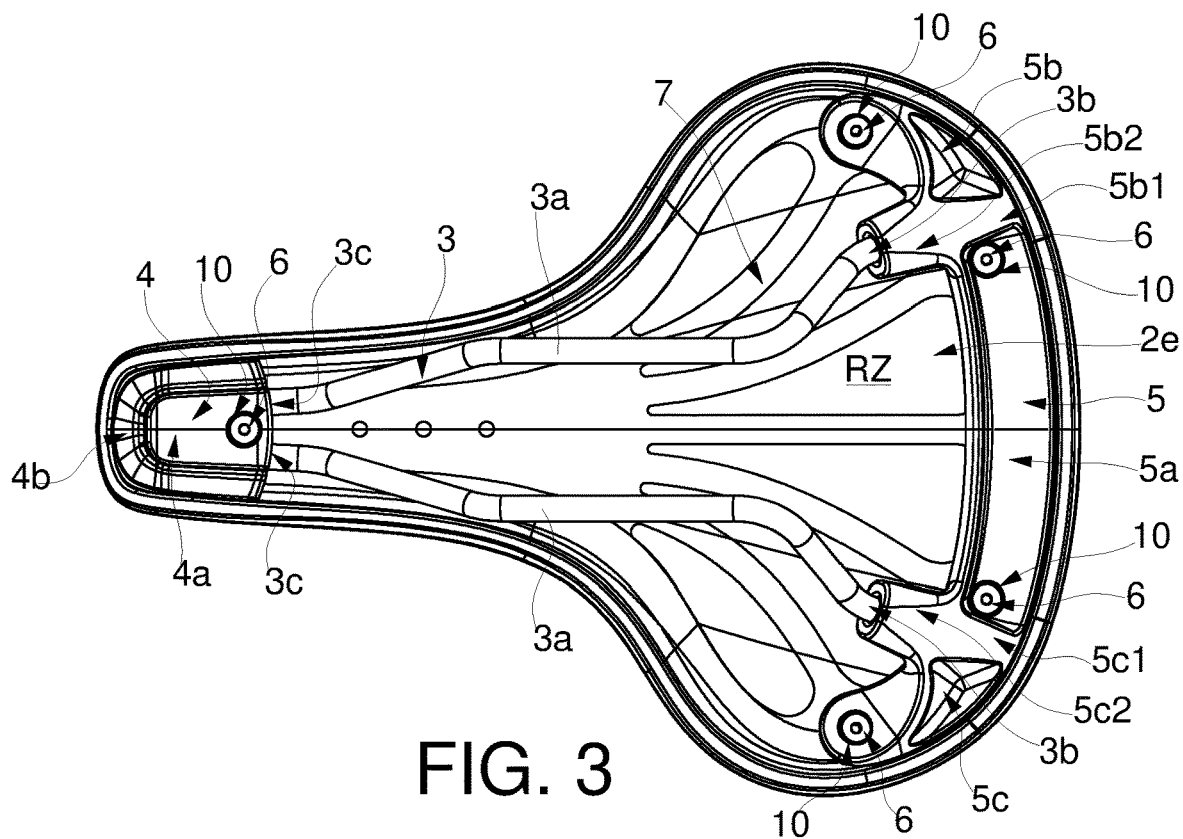
FIG. 3 is a bottom view of the saddle of FIG. 1.
Figure 4:
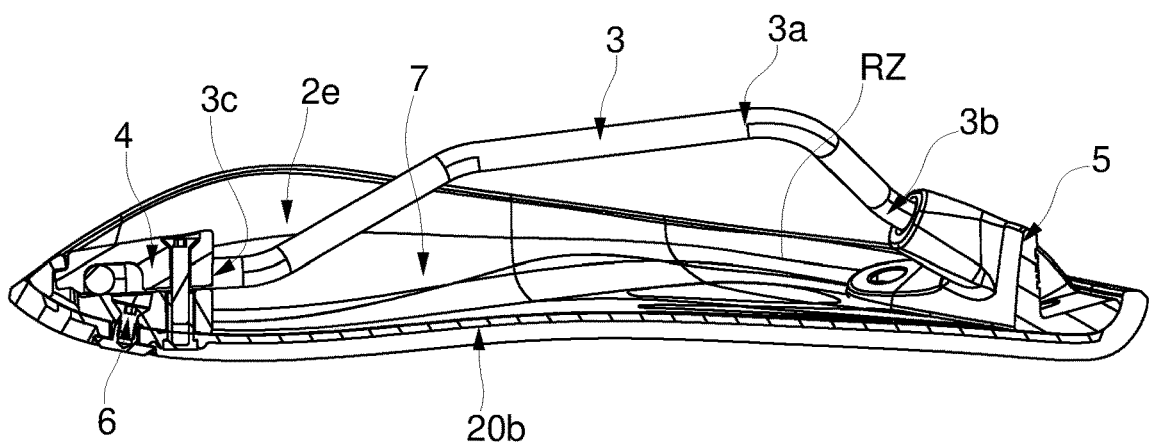
FIG. 4 is a sectional view along the line IV-IV of FIG. 3.
Figure 5:
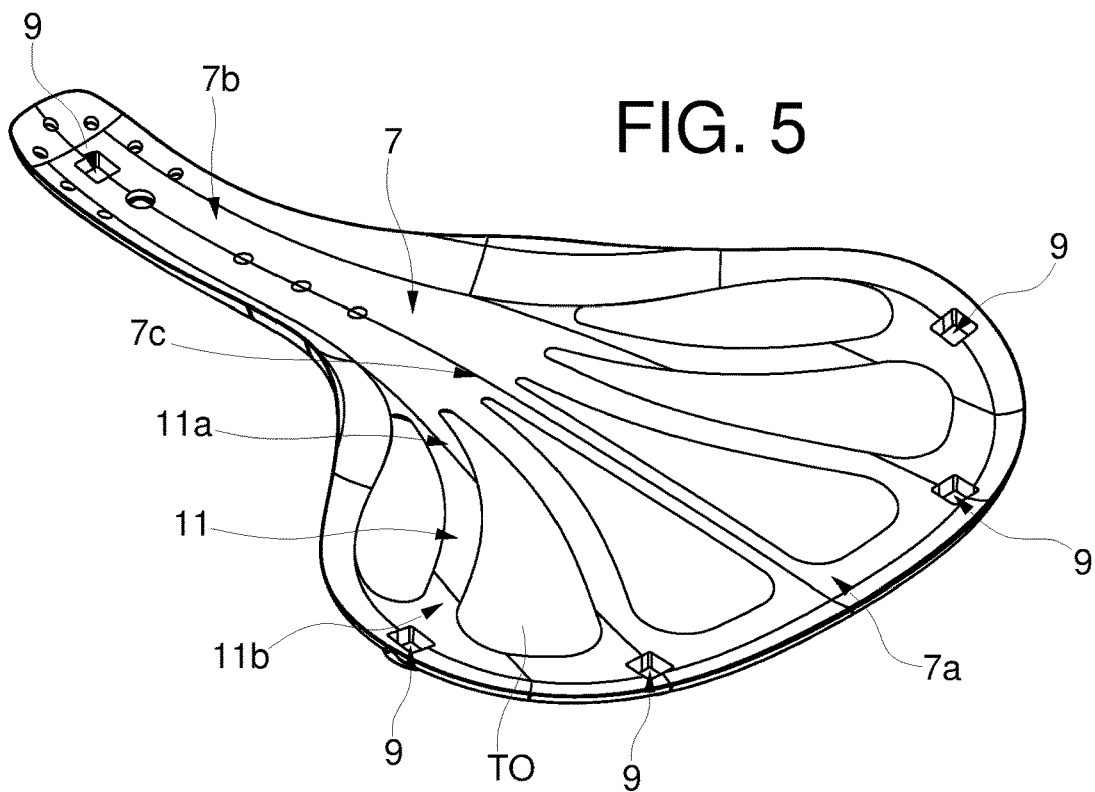
FIGS. 5 and 6 are perspective and bottom views, respectively, of a shell for a saddle according to the present invention.
Figure 6:
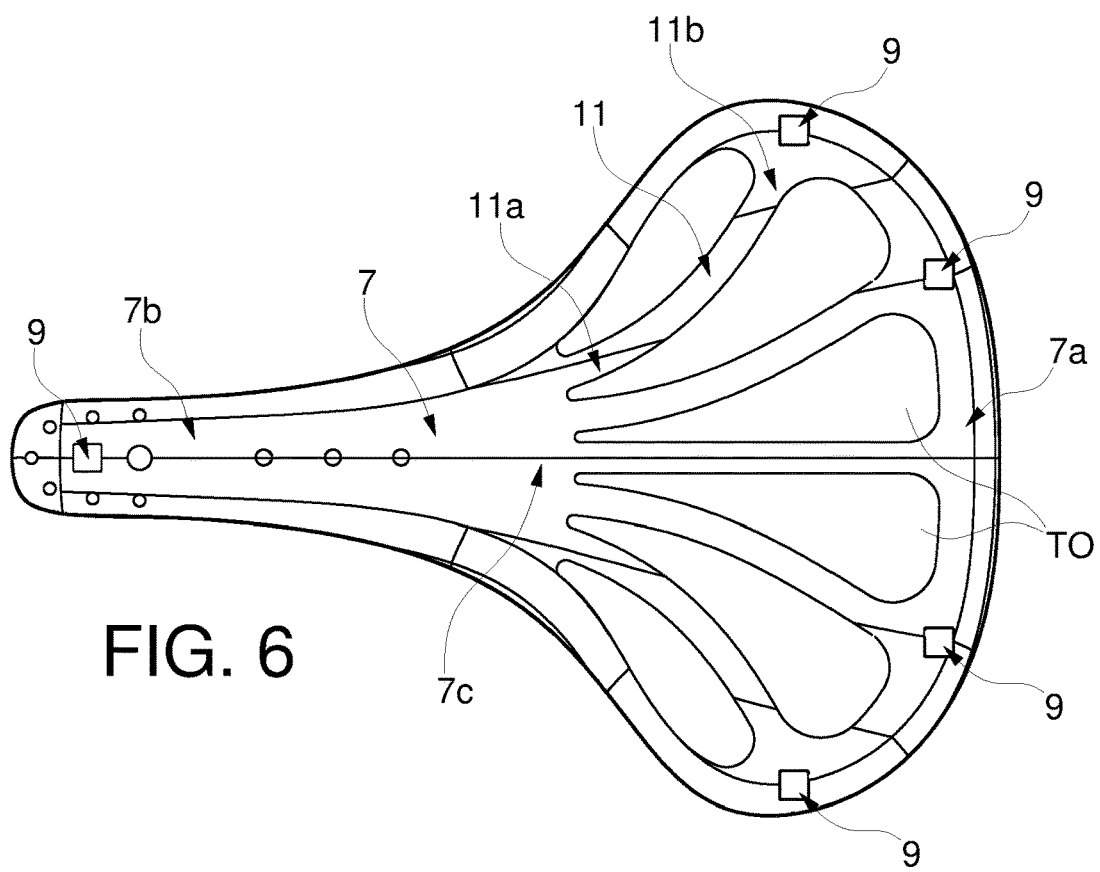
Figure 7:
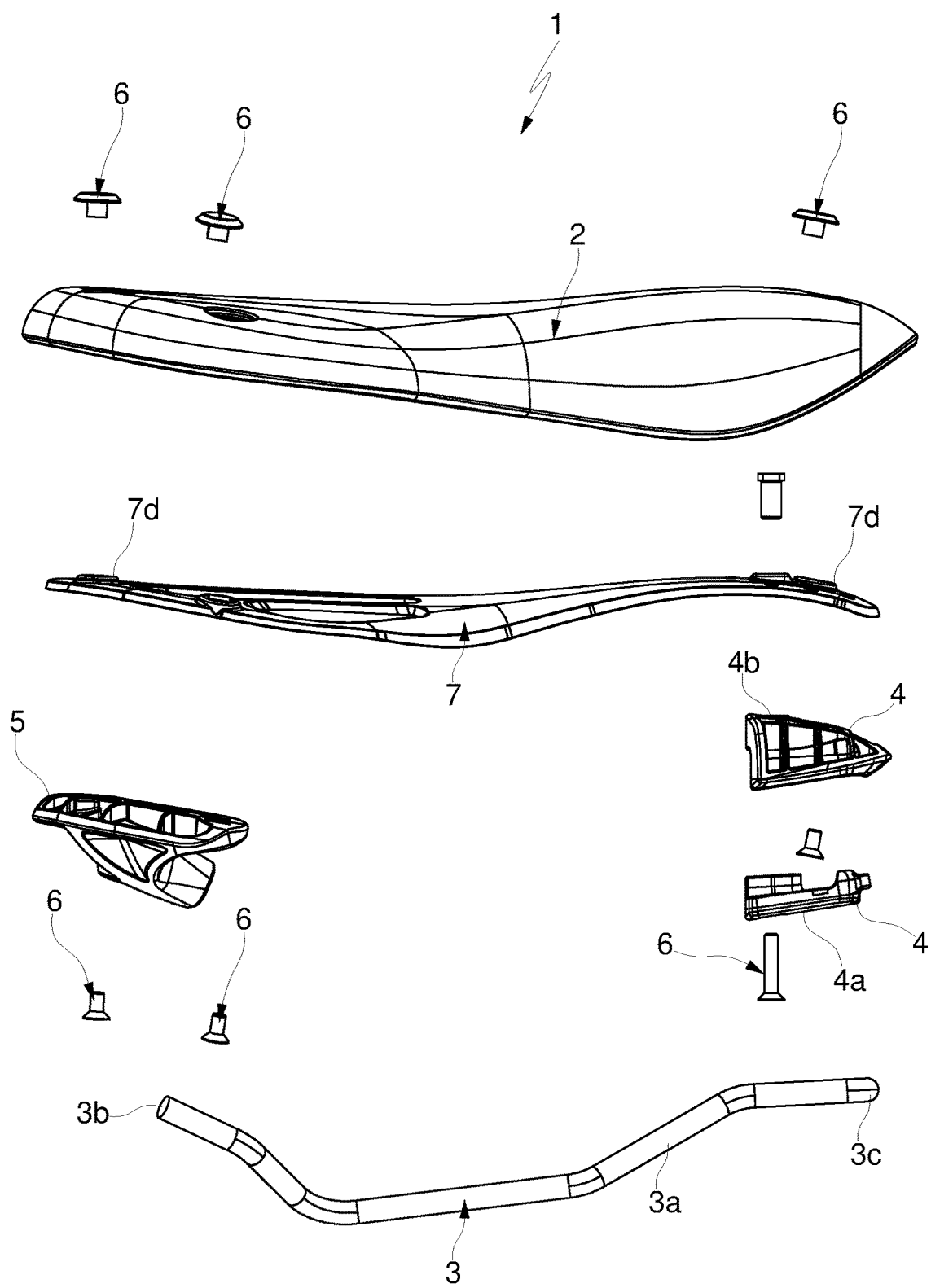
FIGS. 7 and 8 are exploded views taken from respective sides of the saddle of figure T
Figure 8:
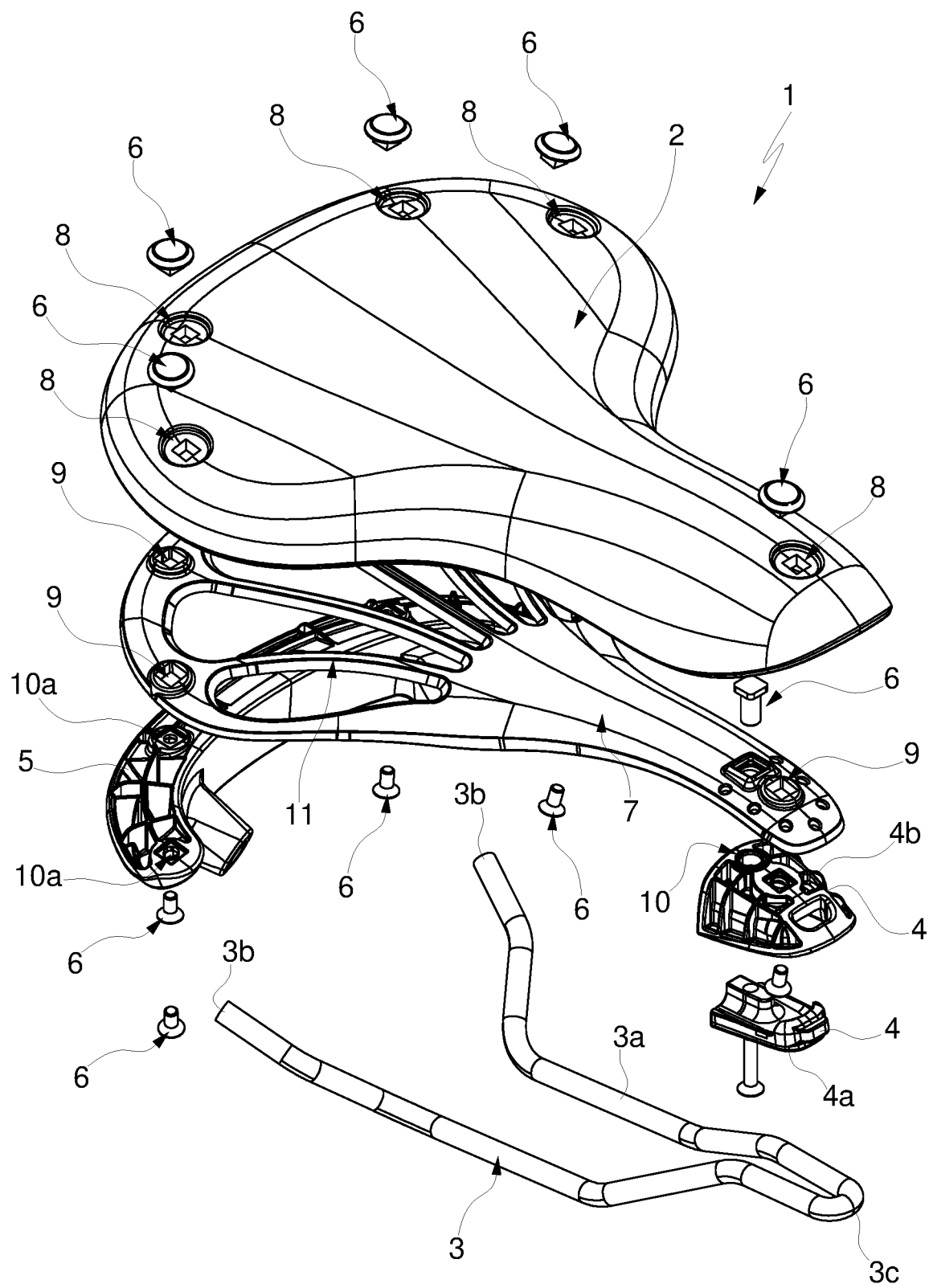

With reference to the attached drawings, a saddle 1 for vehicles, such as bicycles, motorcycles and the like according to the present invention, is shown.

Such saddle 1 comprises a seat component 2 defining a support surface 2a for a user, a fork component 3, at least one front component 4 for constraining the fork component 3 to the seat component 2 and at least one rear component 5 for constraining the fork component 3 to the seat component 2. The constraint components are positioned at the front portion and the rear portion, respectively, of the saddle 1, in particular in a lower position thereof.

The seat component 2 can be made of vulcanized rubber or other polymeric material obtained by injection or compression mold.

This component 2 can have any suitable configuration, for example with an enlarged rear portion 2b, a tapered tip 2c and an intermediate portion 2d with a tapered width in the passage from the rear portion to the tapered tip 2c.

Moreover, the component 2 has a sheet-like element with a flat or slightly curved main wall 20a and a side wall 20b which extends, in use, downwards from the edge of the flat main wall 20a. Preferably, the side wall 20b is annular.

More specifically, the lower, in use, surface 2e of the seat component 2 defines a recessed zone RZ for housing a shell 7, the latter being of a substantially complementary configuration to the lower surface 2e. The recessed zone RZ is preferably delimited between the internal surface of the flat main wall 20a and the internal surface of the side wall 20b.

Connection means 6, such as screws or rivets, are then provided for connecting the front constraint component 4 and the rear constraint component 5 to the seat component 2.

Moreover, the saddle 1 also comprises a shell 7 made of rigid material, for example of plastic or composite material. According to another embodiment of the present invention, the shell 7 could be made of biodegradable and/or eco-sustainable material or of metal or other suitable material.

Preferably, the shell 7 extends from the tip or front F to the rear R of the saddle 1 and has an enlarged rear portion 7a and a tapered tip 7b with a width substantially equal to that of the seat component 2. Clearly, the shell 7 also comprises an intermediate or central portion 7c connecting the enlarged rear portion 7a and tip 7b, so that the width (actually the plan width) of the shell 7 gradually passes from the width of the portion 7a to that of the tip 7b.

More particularly, the shell 7 is housed in the recessed zone RZ and has a substantially complementary configuration to the lower surface 2e or better to the lower, in use, inner surface of the main flat wall 20a.

The enlarged rear portion 7a of the shell 7 can be sunburst-shaped, so as to present a plurality of spokes 11 protruding from a respective intermediate or central portion 7c and each having at least two ends 11a, 11b, a first end 11a protruding from the central portion 7c and a second end 11b opening or ending in the rear of the shell 7.

According to another embodiment of the present invention, the shell 7 could have different shapes to be able to satisfy different compression and therefore comfort requirements.

The shell 7 can delimit two or more open or through areas TO at the respective rear portion, each delimited between two respective spokes 11. If desired, a plurality of openings is provided, for example two, four, six or eight open or through areas TO, if decided such opening are arranged symmetrically with respect to a longitudinal symmetry plane of the saddle 1.

According to an alternative embodiment of the present invention, the shell 7 could also not include through openings and therefore be closed or without holes or openings throughout its extension.

If desired, the sunburst-shaped rear portion 7a extends between ⅓ and ½ of the longitudinal extension of the shell 7.

The spokes 11 must be clearly capable of absorbing the weight transferred by the driver on the seat component 2, with minimal deformation and at the same time guaranteeing stability and lasting resistance over time.

The shell 7 can comprise a slightly curved plate, as indicated above, suitably perforated or with openings.

Moreover, the shell 7 can also have raised sections 7d, if desired around holes or openings, which can constitute stiffening areas or even references for correct assembly or alignment with the seat component 2, which will have suitable areas lowered for housing the raised sections or vice versa raised sections for the insertion in lowered areas in the shell 7.

According to an embodiment of the present invention (not shown in the figures), the shell 7 can also be co-vulcanized with the seat component 2. In this embodiment, the shell 7 is attached to the seat component 2, thereby forming through the co-vulcanization with the latter a single component. If desired, according to this variant, the shell 7 can adhere to the seat component 2 also by means of a primer or other compatibilizing chemistry during the vulcanization step.

Of course, even in this case, the front and rear constraint components 4, 5 will be provided and the shell 7 will be in a position lower, in use, than the seat component 2 and, if desired, in position between the latter and the front and rear constraint components 4, 5.

Advantageously, in order to improve the cohesion between the seat component 2 and the shell 7, the surface of the shell 7 is suitably prepared to make it compatible with the rubber or polymeric material of the seat component 2. In this regard, the preparation steps can include a cleaning of the shell 7 with solvent or other chemical or mechanical substance (for example by sandblasting) and then a primer is applied to the thus treated surface of the shell 7 in order to generate a compatible interface between the shell 7 and the rubber or polymeric material of the seat component 2.

As regards in detail the fork component 3, it can have a tine or a pair of tines 3a having a pair of rear ends 3b fitted in the rear constraint component 5. The front end of the fork component 3 can instead consist of a curved section of the same C-shaped fork component (solution shown in the figures), or of two front ends of two tines.

Therefore, according to the non-limiting embodiment illustrated in the figures, the fork component 3 is made by means of a single suitable bent rod.

The rear constrain component 5 can instead comprise a main section 5a and two wing sections 5b, 5c, each wing section 5b, 5c having a first end 5b1, 5c1 proximal and constraining to the main section 5a as well as a second end 5b2, 5c2 distal from the main section 5a. Each second end 5b2, 5c2 of the wing sections 5b, 5c delimits a seat for fitting to size or forcibly fitting a respective rear end 3b of a respective tine or pair of tines 3a of the fork component 3.

Advantageously, the rear constraint component 5 of the saddle 1 consists of an arched member, if desired, made of metal or plastic, having a shape substantially corresponding to the rear or rear portion 2b of the seat component 2.

Preferably, the rear constraint component 5 is made in a single piece.

If desired, the seat component 2 delimits a plurality of first through holes or slots 8 each designed to be aligned with a respective second hole or slot 9 delimited by the shell 7 and with at least a third hole or slots 10 delimited by the front constraint component 4 or with at least a fourth hole or slots 10a delimited by the rear constraint component 5. In this case, the connection means 6 can be inserted in the aligned holes and/or slots 8, 9, 10, 10a for the connection of the front constraint 4 and of the rear constraint component 5 to the seat component 2 and the resulting tightening of the shell 7 between these components.

Clearly, the fork component 3 can be connected to a seat post (not shown in the figures) in a respective central position, for example by any suitable means.

More specifically, the coupling or connection takes place in a central position with respect to the entire length of the fork component 3, allowing, among other things, the possibility of an adjustment as personalized as possible by the driver.

As regards the front constraint component 4, it can be constituted by a tip member 4a, if desired, made of metal or plastic designed to clamp the front end 3c of the fork component 3 against the shell 7 and more particularly against the seat component 2.

If desired, the front constrain component 4 also comprises a cradle member 4b designed to abut against a tip of the shell 7 and to house the front end 3c of the fork component 3, in which case the front end 3c is clamped between the tip member 4a and cradle member 4b.

In this case, both the tip member 4a and the cradle member 4b have respective holes or slots for the insertion of screws, bolts or rivets.

The present invention also relates to a bicycle comprising a frame, a seat post supported by the frame as well as a saddle 1.

In this case, the fork component 3 is connected or constrained to the seat post in a central or intermediate position of the fork component 3. In this regard, both tines of the fork component 3 will preferably be clamped, advantageously adjustably, between components or plates of the seat post.

As it will be possible to ascertain, thanks to the present invention, the two metal inserts embedded within the rubber of the top as well as the structural fabric provided according to the state of the art referred to above are then replaced with a single piece, preferably in plastic.

In this way it is possible to adjust the flexibility of the saddle according to the designation of the desired model, for example stiffer for racing bicycles and softer for trekking bicycles.

This ensures, among the other things, greater efficiency of the vulcanization process of the top or seat component, as it is no longer necessary to prepare the inserts and the fabric layer on the top or seat component before vulcanization.

Moreover, the sizing of the plastic shell is simple and quick to carry out based on the model and the desired stiffness/flexion.

Furthermore, this shell allows to avoid or reduce any misalignment problems between the fork and reinforcement inserts after a certain period of use, since, being the rubber subject to a creep greater than the material—in particular plastic—used for the obtainment of the shell, it is possible to limit the linear elongation of the seat under tension over time. This condition avoids the increase of the play between the fork and components housing the latter.

Moreover, as it will be possible to ascertain, the presence of the shell, in addition to simplifying the production process, ensures obtaining a saddle better than the traditional ones, since it allows, depending on the design and shape chosen for the shell, to obtain compression and thus comfort zones which are differentiated and suitable for uses different one with respect to the other.

The invention thus conceived is susceptible of numerous modifications and variations, all falling within the scope of the inventive concept.

In practice, the materials used, as well as the contingent shapes and dimensions, may be any according to need without thereby going out the scope of the following claims.

The invention claimed is:

1. A saddle for vehicles, such as bicycles, motorcycles and the like, comprising a seat component defining a support surface for a user, a fork component, at least one front component for constraining said fork component to said seat component and at least one rear component for constraining said fork component to said seat component, and connection means designed to connect said at least one front component and said at least one rear component to said seat component, further comprising a shell made of rigid material, said shell being vulcanized with said seat component, and thus attached thereto, thereby forming a single component therewith,
   wherein said shell extends from a tip to a back of the saddle and has an enlarged rear portion and a tapered tip having a width substantially equal to that of the seat component,
   wherein a lower, in use, surface of said seat component defines a recessed zone (RZ) for housing said shell, the latter having a configuration which is substantially complementary to said lower surface, and
   wherein said shell comprises a rear sunburst-shaped portion, so as to have a plurality of spokes protruding from a respective intermediate or central portion and each having at least two ends, a first end protruding from the central portion and a second end opening into or ending in the back of the shell.

2. The saddle according to claim 1, wherein said shell is made of plastic or a composite material.

3. The saddle according to claim 1, wherein said seat component is made of vulcanized rubber or other polymeric material.

4. The saddle according to claim 1, wherein said fork component has a tine or a pair of tines having a pair of rear ends fitted into said rear constraint component.

5. The saddle according to claim 4, wherein said rear constraint component comprises a main section and two wing sections, each wing section having a first end which is proximal to and constraining said main section, as well as a second end which is distal from said main section, and wherein each second end of said wing sections delimits an engagement seat of a respective rear end of a respective tine or pair of tines of said fork component.

6. The saddle according to claim 1, wherein said seat component delimits a plurality of first through holes each designed to be aligned with a respective second hole delimited by said shell and with at least a third hole delimited by the front constraint component, or with at least a fourth hole delimited by the rear constraint component, said connection means being insertable in said holes aligned for connecting said front constraint component and said rear constraint component to said seat component.

7. The saddle according to claim 1, wherein said fork component is connectable to a seat post in a respective central position.

8. The saddle according to claim 1, wherein said front constraint component consists of a tip member, made of metal or plastic, designed to clamp the front end of said fork component onto the seat component.

9. The saddle according to claim 8, wherein said front constraint component comprises a cradle member designed to abut against a tip of said shell and to house said front end of said fork component, wherein said front end is clamped between said tip member and said cradle member.

10. The saddle according to claim 1, wherein said rear constraint component of the saddle consists of an arched member, made of metal or plastic, having a shape substantially corresponding to the back or part of the back of said seat component.

11. The saddle according to claim 1, wherein said connection means comprise screws or rivets.

12. The saddle according to claim 1, wherein the shell delimits two or more open or through areas at the respective rear portion.

13. The saddle according to claim 1, wherein the shell delimits six open or through areas symmetrically with respect to a plane of longitudinal symmetry of the saddle.

14. A bicycle comprising a frame, a seat post supported by the frame, as well as a saddle according to claim 1, wherein said fork component is connected to a seat post in a central position of said fork component, both tines of the fork component being clamped between components or plates of the seat post.

* * * * *